United States Patent Office 3,017,389
Patented Jan. 16, 1962

3,017,389
PROCESS OF CONTROLLING THE MOLECULAR WEIGHT OF LINEAR FORMALDEHYDE POLYMERS
William Philip Langsdorf, Jr., Robert Neal MacDonald, and Carl Earle Schweitzer, Wilmington, Del., assignors to E. I. du Pont de Nemours and Company, Wilmington, Del., a corporation of Delaware
No Drawing. Filed Mar. 18, 1955, Ser. No. 495,335
4 Claims. (Cl. 260—67)

This invention relates to a process of preparing high molecular weight linear polymers of formaldehyde having any desired molecular weight, and more particularly, to a method of controlling the molecular weight of polymeric formaldehyde.

There are disclosed and claimed in copending application Serial No. 408,172, now Patent No. 2,768,994, filed by R. N. MacDonald on February 4, 1954, processes for polymerizing formaldehyde and the high molecular weight polymers produced thereby. Such processes, however, are not easily controlled and may produce polymeric compositions which are mixtures of polymer molecules of various sizes and which have polymer chains of various lengths. Depending upon the reaction time, the catalyst employed and other process variables, the polymer composition may be relatively high or low in molecular weight. The molecular weight of a polymer is related to many of its physical properties such as toughness and melt viscosity, and it is therefore apparent that a method of controlling molecular weight is highly desirable since products having selected physical properties can be prepared directly in the polymerization process. For example, it is known that for use in an injection molding process the polymer should have a low melt viscosity, while in applications such as the melt pressing of films, the polymer should have a high melt viscosity. Procedures for obtaining directly from the polymerization reactor addition polymers of formaldehyde having any selected molecular weight (and thereby, certain selected physical properties) have not been known prior to this time.

As described at pages 418–421 in "High Polymers," vol. 1, Interscience Publishers, New York (1940), molecular weights of polymeric substances may be determined in various ways, although they are normally reported as either "weight average molecular weight" ($\overline{M_w}$) or "number average molecular weight" ($\overline{M_n}$). The fact that these two types of molecular weights may have different values for a given polymeric substance is interpreted to means that the molecules making up the polymeric substance have various chain lengths or degrees of polymerization. It is generally believed that variations in $\overline{M_w}$ affect the flow properties such as melt viscosity of the polymer, and, therefore, indicate from a practical point of view whether a polymer may be easily molded or extruded. On the other hand, the value of $\overline{M_n}$ is generally believed to be a measure of the polymer's strength properties, such as impact strength, elongation, and low temperature brittleness. The ratio of $\overline{M_w}/\overline{M_n}$ is often employed to indicate the distribution of chain lengths in a polymeric substance, this ratio being equal to unity when the polymeric substance is completely homogeneous, i.e. when all polymer molecules are substantially the same length. The value of 1 for this ratio, however, is a theoretical limit, and it is generally accepted by those skilled in the art that the ratio of $\overline{M_w}/\overline{M_n}$ cannot be reduced below a value of about 2 for most polymers. Accordingly, as the $\overline{M_n}$ value of the polymer is increased in order to gain strength properties, the $\overline{M_w}$ value of the polymer automatically increases twice as fast, forming a more highly viscous material which is more difficult to fabricate by molding and other methods involving flow of the polymer. There is a balance which allows one to choose between a gain in strength properties and a loss in fabricability, or, vice versa, a loss in strength properties with a gain in the ease of fabrication. It, therefore, is of great importance to the manufacturer of the polymeric substance to be able to control the process to the extent that formaldehyde polymers can be prepared for any of a variety of end uses, and, furthermore, that the method of control not be complicated by the necessity of changing reactant concentrations, feed stream rates, or reaction times. The most desirable procedure for effecting molecular weight control is to employ an additive, usually called a chain transfer agent, in such concentrations that it allows the polymer chains to reach some selected length before growth is stopped by attachment of the additive to the growing polymer chain.

The principle of employing chain transfer agents to control a free radical type of polymerization is well known. For example, in the polymerization of styrene, if carbon tetrachloride is present, a lower molecular weight polystyrene is produced than would be the case if carbon tetrachloride were absent. In a similar fashion chloroform acts as a chain transfer agent in the polymerization of ethylene to control the molecular weight of the polyethylene. The polymerization of formaldehyde however is not a free radical type of polymerization, it is an ionic type of polymerization, some polymerization initiators acting apparently by an anionic mechanism while others seem to act by a cationic mechanism. The scarcity of published information on ionic polymerization indicates that very little is known about the subject, and even less is known about anionic or cationic polymerizations. Furthermore, there is no known art relating to the use of chain transfer agents in the ionic polymerization of formaldehyde.

In copending application Serial No. 495,323, filed by A. C. Knight on March 18, 1955, there is disclosed and claimed a process for controlling the polymerization of formaldehyde by employing water, methanol, or formic acid as chain transfer agents, the controlled amount being that which satisfies a mathematical equation. Water, methanol, formic acid, methylal, methyl formate, and carbon dioxide are all commonly found as impurities in formaldehyde and, therefore, it is important that the first three of these compounds in the formaldehyde monomer be reduced to such a level that polymer of the desired molecular weight may be produced by polymerization of the thus purified monomer. It has now been found that many other compounds, defined below, are capable of causing chain transfer in the polymerization of formaldehyde. These compounds are not normally found as impurities in formaldehyde and their chain transfer activity is not as great as that of water, methanol, or formic acid. Accordingly, chain transfer agents of the present invention are additives for the formaldehyde polymerization and may be utilized in large enough amounts that quantitative analysis of such amounts does not admit of any great error.

It is an object of this invention to provide a process for controlling the molecular weight of an addition polymer of formaldehyde formed by ionic polymerization. It is another object of this invention to provide a process in which formaldehyde is polymerized in the presence of small amounts of a novel group of chain transfer agents to produce polymers of a lower molecular weight than would otherwise be obtainable. Other objects will be apparent to those skilled in the art.

The above objects are accomplished in accordance with the process of this invention by subjecting to polymerization conditions a composition comprising formaldehyde and a chain transfer agent selected from a described class. In general these agents are capable of being cleaved into ionic pairs by ionic attack. The ionic pairs cause the addition of monomer units on one polymer chain to stop, and at the same time, cause the addition of monomer units to start at another site; one of the pair stops the growth of the first chain while the other of the pair starts the growth of a second chain.

These chain transfer agents are all known to be reactive with the Grignard reagent, methyl magnesium iodide, thus indicating that these agents can be cleaved into pairs by ionic attack. There, of course, are some compounds which are reactive with the Grignard reagent but which are not suitable as chain transfer agents in the process of this invention, and such compounds are not claimed herein. The classes of organic compounds which have been found to exhibit chain transfer activity in the process of this invention are carboxylic acids having at least 2 carbon atoms, esters having at least 3 carbon atoms, aliphatic alcohols having at least 2 carbon atoms, cycloaliphatic alcohols, aromatic alcohols, carboxylic acid anhydrides, amides, imides, imines, halides, carbonates, silicates, phosphites, thiophanes, aralkyl ethers, sulfides, cyclic sulfoxides, nitro compounds, having a hydrogen atom on the carbon alpha to the nitro group, and sulfur analogs of the above compounds.

Specific compounds falling within these classes include, but are not limited to, acetic acid, propionic acid, thioacetic acid, ethyl acetoacetate, ethyl benzoate, butanol, cyclohexanethiol, benzyl alcohol, acetic anhydride, butyric anhydride, acetamide, propionimide, cyclohexanimine, tert.-butyl chloride, bis(2-methoxyethyl) carbonate, thiophane, ethylphenyl ether, cetyl ethyl sulfide, tetramethylene sulfoxide, tertiary dodecyl mercaptan, nitromethane, and many others. There are other compounds which are potentially capable of acting as chain transfer agents, such as amines, hydrazines, hydrazides, and phenols, however since these compounds exhibit other activities such as being active polymerization initiators or active antioxidant stabilizers, it is extremely difficult to analyze their chain transfer activity, and they therefore form no part of the present invention.

There are dimers, trimers, and higher polymers of some of the above compounds which can act as chain transfer agents. For example, polyethylene glycol may be employed. Such polymeric compounds, however, are not desirable if their molecular weight is too high, and in general, the preferred compounds have a degree of polymerization less than 10.

In more detailed terms, the above objects of this invention are accomplished by employing a dispersion polymerization process in which formaldehyde is introduced continuously into an organic liquid medium containing a polymerization catalyst, such as triphenyl phosphine or a quaternary ammonium salt, and containing a small amount of one or more of the described chain transfer agents, and imposing polymerization conditions on this mixture of compounds to produce dispersed particles of an addition polymer of formaldehyde having a decreased number average molecular weight.

The process of this invention provides a means by which the polymerization of formaldehyde may be controlled so as to prevent the formation of polymers which are so high in molecular weight that it is difficult to employ such polymers in modern fabrication procedures, such as injection molding and the like. The more of the chain transfer agent that is present in the polymerization system, the less will be the molecular weight of the product. Thus the process of this invention provides a group of compounds which may be added to the polymerization in small amounts and thereby produce the desired effect of stopping the polymer chain from growing into molecules which are too big to have the desired physical properties.

The polymeric products of this process are visualized as having the following structural formula:

$$A(CH_2O)_nB$$

in which $n$ is an integer greater than about 340 and A and B are the portions formed by ionic cleavage of a chain transfer agent from the group listed above. Accordingly, A and B are the complementary parts of the chain transfer agent, which parts are formed by the cleavage of the bond by ionic attack as described above. If AB is acetic anhydride having the formula

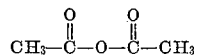

then after ionic attack A is

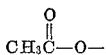

and B is

It may be seen, therefore, that chain transfer agents operate in the process of this invention by splitting into ionic pairs at the bond which is subject to ionic attack, one of the pair forming the end of a growing polymer chain while the other of the pair starts a new polymer chain. Bonds which are known to be subject to ionic attack include C—O, O—H, C-Halogen, N—H, S—H, H-Halogen, S—O, P—O, Si—O, C—N, and C—S.

It is of course possible that in some cases a chain transfer agent will be formed in situ by reaction of formaldehyde with a compound present in the system from some other source. Such a chain transfer agent might be formed by the reaction of dimethylaniline with formaldehyde to produce p-dimethylaminobenzyl alcohol. This process is intended to include the employment of the above-mentioned chain transfer agents, whether they are formed in situ or are present because they are physically added to the system. Furthermore, it is immaterial whether these chain transfer agents are added directly to the polymerization system or to a stream entering the polymerization system, such as the monomer feed stream.

The following examples are illustrative of the processes and products of this invention. Parts and percentages are by weight unless otherwise specified. Inherent viscosity is measured at 150° C. on a solution of 0.5 gram of polymer in 100 ml. of dimethylformamide containing 1.0 gram of diphenylamine. Melt viscosities are measured in a piston rheometer having an orifice 0.031 inch in diameter and 0.503 inch in length, the measurement conditions being 200° C. and a shear stress of 6.53 p.s.i.

Number average molecular weight ($\overline{M_n}$) is determined preferably by known methods of osmometry. In some instances herein, $\overline{M_n}$ is determined by a measurement of melt viscosity, which in turn is translated into $\overline{M_n}$ via correlations which have been found to be applicable to particular polymerization systems.

*Examples 1 to 7.*—Monomeric formaldehyde is generated by pyrolyzing cyclohexyl hemiformal at 135° C.

to about 160° C. The monomer is purified by passing it through one or more cold traps maintained at about 0° C., followed by passing the purified monomer into a pair of glass polymerization vessels connected in parallel, each vessel containing 500 ml. of the indicated hydrocarbon reaction medium and the indicated amount of dimethyl di(hydrogenated tallow)ammonium acetate as the polymerization catalyst. (The term "hydrogenated tallow" is used here and elsewhere in this description to represent a mixture of about 70% octadecyl and 30% hexadecyl hydrocarbons.) Before the admission of monomeric formaldehyde, there is introduced into one of the vessels a known amount of the material which is to be utilized as a chain transfer agent. The other vessel serves as a control, containing none of the agent. The reaction medium is rapidly agitated as the formaldehyde monomer is introduced, and particles of polymer form continuously during the reaction time, which ranged from 8 minutes to 120 minutes. The results are found in Table I.

withdrawn continuously from the reactor. The polymer is then filtered and dried. A control polymer is prepared by methods similar in all details to the experimental run except that the polyether alcohol is omitted. The experimental run (in the presence of polyether alcohol as a chain transfer agent) produced 214 grams of polymer having an inherent viscosity of 1.1, a number average molecular weight of 58,000 and a melt viscosity of 19,000 poises. The control run (prepared in the absence of the polyether alcohol) produced 183 grams of polymer having an inherent viscosity of 1.55, a number average molecular weight of 70,000, and a melt viscosity of 31,000 poises.

*Examples 9 to 12.*—The same procedure for polymerization as that described for Examples 1 to 7 is used here, with the exception that the amount of catalyst employed is 1 milligram of dimethyl di(hydrogenated tallow)ammonium acetate per liter of reaction medium. The results are shown in Table II. Two values of inherent viscosity

*Table I*

| Example | Chain transfer agent | Mols chain transfer agent per mol formaldehyde polymerized | Reaction medium | Milligrams catalyst per liter of reaction medium | Yield grams polymer per liter reaction medium per hour | Inherent viscosity | Number average molecular weight ($\overline{M}_n$) | Melt viscosity poises |
|---|---|---|---|---|---|---|---|---|
| 1a | None | None | Heptane | 2.16 | 150 | 1.73 | 148,000 | 500,000 |
| 1b | Cyclohexanol | 0.0031 | do | 2.16 | 284 | 1.07 | 78,000 | 44,000 |
| 2a | None | None | do | 2.16 | 120 | 1.77 | 137,000 | 330,000 |
| 2b | Benzyl alcohol | 0.0031 | do | 2.16 | 280 | 0.95 | 70,000 | 31,000 |
| 3a | None | None | do | 2.16 | 138 | 0.88 | 53,000 | 14,500 |
| 3b | Ethyl acetoacetate | 0.0031 | do | 2.16 | 286 | 0.61 | 18,000 | 1,700 |
| 4a | None | None | do | 2.16 | 107 | | 51,000 | 13,500 |
| 4b | Benzoic anhydride | 0.0082 | do | 2.16 | 184 | | 21,000 | 2,200 |
| 5a | None | None | do | 10.0 | 218 | | 133,000 | 300,000 |
| 5b | Butyric anhydride | 0.009 | do | 10.0 | 253 | | 66,000 | 26,000 |
| 6a | None | None | do | 10.0 | 218 | | 133,000 | 300,000 |
| 6b | Bis(2-methoxyethyl) carbonate | 0.01 | do | 10.0 | 200 | | 21,000 | 2,200 |
| 7a | None | None | do | 10.0 | 218 | | 133,000 | 300,000 |
| 7b | Tertiary butyl chloride | 0.0163 | do | 10.0 | 203 | | 42,000 | 80,000 |

*Example 8.*—Monomeric formaldehyde is generated continuously by the pyrolysis of cyclohexyl hemiformal at 140–160° C. The vapors are continuously condensed, passed through a vapor-liquid separator and the gaseous formaldehyde is then passed through a series of packed (McMahon or Cannon stainless steel packing) cold traps held at 0° C. This purified monomer is passed continuously into a polymerization vessel containing 700 ml. of rapidly agitated cyclohexane, 0.0014 mol of polyether alcohol per mol of formaldehyde polymerized, and 0.7 milligram of tetrabutylammonium laurate. The polyether alcohol employed is polyethylene glycol mono-p-octylphenyl ether with a short polyethylene glycol chain. The cyclohexane, the polyether alcohol, and the tetrabutylammonium laurate are added continuously to the reactor over a period of 14 minutes, and a slurry of a white polymeric formaldehyde suspended in the hydrocarbon is are shown for each example because duplicate determinations were made on portions of the same polymer sample.

*Table II*

| Example | Chain transfer agent | Mols chain transfer agent per mol formaldehyde polymerized | Reaction medium | Yield grams polymer per liter reaction medium per hour | Inherent viscosity | Number average molecular weight ($\overline{M}_n$) | Melt viscosity poises |
|---|---|---|---|---|---|---|---|
| 9a | None | None | 500 ml. heptane | 75 | 1.01, 1.07 | 78,000 | 44,000 |
| 9b | Phenyl benzoate | 0.007 | 500 ml. heptane | 63 | 0.74, 0.75 | 54,000 | 15,000 |
| 10a | None | None | 500 ml. heptane | 100 | 1.07, 1.27 | 72,000 | 34,000 |
| 10b | Tributyl phosphite | 0.1 | 500 ml. heptane | 180 | 0.66, 0.78 | 27,000 | 3,200 |
| 11a | None | None | 500 ml. toluene | 209 | 0.51, 0.47 | 21,000 | 2,200 |
| 11b | Acetamide | 0.034 | 500 ml. toluene | 156 | 0.30, 0.25 | 2,000 | 200 |
| 12a | None | None | 500 ml. heptane | 128 | 1.61, 1.67 | 144,000 | 450,000 |
| 12b | Tetraethyl silicate | 0.16 | 500 ml. heptane | 108 | 1.10, 1.14 | 91,000 | 72,000 |

*Examples 13 to 25.*—In this series of examples tests are made to determine whether the presence of any among various chain transfer agents in a polymerization system will cause the polymeric formaldehyde product to have a lower molecular weight than the product produced in the absence of that chain transfer agent. The polymerization process is substantially the same as that described in the preceding examples, although in some instances other catalysts are employed. The effect of lowering the molecular weight is observed by determining the inherent viscosity of two comparative products, one product being formed in the absence of the indicated chain transfer agent and the other product being formed in the presence of the chain transfer agent. All other variables of each pair of comparative experiments are identical. The results are shown in Table III.

Table III

| Example | Polymerization medium | Catalyst | Catalyst concentration milligrams catalyst/ liter polymerization medium | Chain transfer agent | Concentration of chain transfer agent mols/ mol formaldehyde polymerized | Polymer yield grams polymer/ liter polymerization medium/ hr. | Inherent viscosity |
|---|---|---|---|---|---|---|---|
| 13a | Heptane | Aluminum isopropoxide | 3.5 | None | None | 29 | 1.02 |
| 13b | ----do---- | ----do---- | 3.5 | Methyl iodide | 0.0000075 | 32 | 0.85 |
| 14a | ----do---- | Triphenylphosphine | 10 | None | None | 33.8 | 5.5 |
| 14b | ----do---- | ----do---- | 10 | Tetrahydrothiophene | 0.0000015 | 39.8 | 2.0 |
| 15a | ----do---- | ----do---- | 10 | None | None | 37.1 | 5.5 |
| 15b | ----do---- | ----do---- | 10 | Tetramethylenesulfoxide | 0.00002 | 27.2 | 0.12 |
| 16a | Benzene | ----do---- | 2 | None | None | 54 | 0.70 |
| 16b | ----do---- | ----do---- | 2 | N-hydroxymethylphthalimide | 0.00012 | 17.6 | 0.31 |
| 17a | Heptane | (1) | 1 | None | None | 267 | 1.45 |
| 17b | ----do---- | (1) | 1 | Nonylanisole | 0.0022 | 420 | 0.62 |
| 18a | ----do---- | (1) | 1 | None | None | 47 | 1.23 |
| 18b | ----do---- | (1) | 1 | Nitromethane | 0.04 | 63 | 0.23 |
| 19a | ----do---- | (1) | 1 | None | None | 64 | 0.55 |
| 19b | ----do---- | (1) | 1 | Triphenyl-phosphate | 0.012 | 46 | 0.26 |
| 20a | ----do---- | (1) | 1 | None | None | 78 | 1.87 |
| 20b | ----do---- | (1) | 1 | Benzoic acid | 0.027 | 27 | 1.06 |
| 21a | ----do---- | (1) | 1 | None | None | 139 | 1.80 |
| 21b | ----do---- | (1) | 1 | Amyl acetate | 0.17 | 161 | 1.23 |
| 22a | Decahydronaphthalene | None | None | None | None | 20.4 | [2] 2.1 |
| 22b | ----do---- | ----do---- | None | Hexanol | 0.0098 | 27.2 | [2] 0.38 |
| 23a | Toluene | (1) | 2 | None | None | 250 | 0.7 |
| 23b | ----do---- | (1) | 2 | Acetic anhydride | 0.2 | 200 | 0.2 |
| 24a | Heptane | Triphenylphosphine | 7 | None | None | 70 | 1.78 |
| 24b | ----do---- | ----do---- | 7 | Dimethyl piperazine | 0.0001 | 100 | 0.88 |
| 25a | Cyclohexane | (3) | 1 | None | None | 183 | 1.55 |
| 25b | ----do---- | (3) | 1 | Tertiary dodecyl mercaptan | 0.04 | 350 | 0.28 |

[1] The catalyst is dimethyl di(hydrogenated tallow) ammonium acetate.
[2] Inherent viscosity was measured at 60° C. on a 0.5% solution of the polymer in p-chlorophenol containing 2% by weight of alpha-pinene.
[3] The catalyst is tetrabutylammonium laurate.

*Example 26.*—A reaction mixture comprising 600 ml. heptane, 1.2 milligrams dimethyl di(hydrogenated tallow)ammonium acetate, and 0.0044 mol benzoic anhydride per mol of formaldehyde polymerized is continuously fed into a reactor in which the contents are maintained at 45° C., and the polymeric formaldehyde product is continuously removed as a slurry in heptane, effecting a holdup time of 5 minutes through the reactor.

The slurry is filtered and the polymer which is separated is air dried at 68° C., extracted with methanol for 24 hours, filtered again, washed with acetone in a Waring Blendor, and finally dried under vacuum at 68° C. Infrared examination of the dried polymer discloses that it contains 0.98 benzoate groups/1000 molecules of formaldehyde.

As a comparative run, 20 grams of polymeric formaldehyde having an inherent viscosity of 1.1 is stirred for 15 minutes at 35° C. in 500 ml. of dry heptane containing 1 milligram of dimethyl di(hydrogenated tallow)ammonium acetate and 1 gram of benzoic anhydride (0.0065 mole/mole polymeric formaldehyde). The slurry is filtered, washed with cyclohexane and acetone, reslurried in a Waring Blendor with methanol, filtered again, washed with acetone, and finally dried under vacuum at 70° C. No benzoate groups could be detected in the polymer either by infrared spectrometry or chemical analysis of the products of acid hydrolysis. These comparative runs indicate that the chain transfer agent is active during polymerization, but that there is no reaction with the polymeric formaldehyde after it is formed.

By means of the process of this invention it is now possible to prepare linear high molecular weight polymers of formaldehyde having a molecular weight which is high or low, depending on the absence or presence of a chain transfer agent. Accordingly, by purifying the reactant streams and removing as many of the chain transfer agents as possible from those streams, a polymer may be prepared having a very high molecular weight, and contrariwise, by adding increasing amounts of any of the chain transfer agents to the polymerization stream, polymers may be prepared having lower and lower molecular weights.

The amount of chain transfer agent which may be employed in any embodiment of this process will depend upon the quality of product which is desired to be produced and upon the activity of the particular chain transfer agent employed. In the examples there are shown instances where the amount of chain transfer agent is as low as 0.0000075 mole per mole of monomeric formaldehyde polymerized and amounts as high as 0.2 mole of chain transfer agent per mole of monomeric formaldehyde polymerized. These are not meant to be critical limitations since it may be seen that as the amount of chain transfer agent which is present approaches zero the molecular weight of the formaldehyde polymer which is produced under a given set of conditions will be higher and higher, and on the other hand, there may be such a large amount of chain transfer agent which is present that only very low polymers will be formed. For the products of this invention which may have inherent viscosities of from about 0.2 to about 10.0, the amount of chain transfer agent may vary from about 0.5 mole to about 0.0000001 mole per mole of formaldehyde polymerized. The preferred product for injection molding applications are those having a number average molecular weight from about 10,000 to 100,000. Higher molecular weight products may, of course, be used for other applications where a relatively low melt viscosity is not important.

The process of this invention is applicable generally to any type of polymerization process, regardless of the source of formaldehyde, the catalyst employed, the reaction conditions, such as temperature and pressure, or other process variables. The preferred polymerization process is one in which substantially pure anhydrous formaldehyde (containing less than about 500 p.p.m. of impurities) is polymerized in the form of a dispersion at atmospheric pressure and ordinary temperatures, employing a quaternary ammonium salt as a catalyst. A process for polymerizing formaldehyde in the presence of quaternary ammonium salts as initiators is described and claimed in U.S. Patent 2,994,687, which issued August 1, 1961, to H. H. Goodman and L. T. Sherwood.

The products of this invention are high molecular weight linear polymers of formaldehyde which may be molded into various articles, spun into fibers, or filaments, extruded, or otherwise formed into films, sheets, tubes, rods, and so forth.

We claim:
1. The process of preparing an addition polymer of formaldehyde with a reduced number average molecular weight of 10,000 to about 100,000 comprising continuously introducing substantially anhydrous formaldehyde into an inert liquid hydrocarbon medium containing a formaldehyde polymerization initiator and a small amount of an organic chain transfer agent having a degree of polymerization less than 10, being free of amine groups and phenol groups, and being selected from the group consisting of monofunctional esters having at least 3 carbon atoms, aliphatic alcohols having at least 2 carbon atoms, cycloaliphatic alcohols, aromatic alcohols, acid anhydrides, amides, imides, halides, carbonates, silicates, phosphites, phosphates, thiophanes, sulfides, cyclic sulfoxides, and nitro compounds having a hydrogen on the carbon alpha to the nitro group, and recovering an addition polymer of formaldehyde having a number average molecular weight of 10,000 to 100,000.

2. The process of claim 1 in which said chain transfer agent is cyclohexanol.

3. The process of claim 1 in which said chain transfer agent is acetic anhydride.

4. The process of preparing an addition polymer of formaldehyde with a reduced number average molecular weight of 10,000 to about 100,000 comprising continuously introducing substantially anhydrous formaldehyde into an inert liquid hydrocarbon medium containing a quaternary ammonium salt as a formaldehyde polymerization initiator and 0.0000001 to 0.5 mol per mol of formaldehyde polymerized of an organic chain transfer agent which has a degree of polymerization of less than 10, which is free of amine groups and of phenol groups, and which is selected from the group consisting of monofunctional esters having at least 3 carbon atoms, aliphatic alcohols having at least 2 carbon atoms, cycloaliphatic alcohols, aromatic alcohols, acid anhydrides, amides, imides, halides, carbonates, silicates, phosphites, phosphates, thiophanes, sulfides, cyclic sulfoxides, and nitro compounds having a hydrogen on the carbon alpha to the nitro group, and recovering an addition polymer of formaldehyde having a number average molecular weight of 10,000 to 100,000.

References Cited in the file of this patent
UNITED STATES PATENTS

| | | |
|---|---|---|
| 2,296,249 | Austin et al. | Sept. 22, 1942 |
| 2,704,765 | Smithson | Mar. 22, 1955 |
| 2,734,889 | Starr | Feb. 14, 1956 |
| 2,768,994 | MacDonald | Oct. 30, 1956 |

OTHER REFERENCES

Carruthers et al.: Trans. Far. Soc., vol. 32, 1936, pp. 195–198, 203, 205–208.

Flory: Principles of Polymer Chemistry, Cornell Univ. Press, 1953, pp. 136–138, 141 and 145.

Walker: Formaldehyde, Reinhold, 1953, pp. 34 and 35.

Chemical Abstracts, vol. 46, 1952, pages 5928–5929.

Walker: Formaldehyde, Reinhold, 1953, pages 116, 138 and 143–146.